United States Patent
Jansson et al.

(10) Patent No.: US 12,543,118 B2
(45) Date of Patent: Feb. 3, 2026

(54) METHODS FOR LOW ENERGY MOVEMENT DETECTION IN WIRELESS COMMUNICATION DEVICES

(71) Applicant: Telefonaktiebolaget LM Ericsson (publ), Stockholm (SE)

(72) Inventors: Jens Jansson, Eslöv (SE); Jagadeesh Arunachalam, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 596 days.

(21) Appl. No.: 17/909,850

(22) PCT Filed: Mar. 10, 2020

(86) PCT No.: PCT/EP2020/056328
§ 371 (c)(1),
(2) Date: Sep. 7, 2022

(87) PCT Pub. No.: WO2021/180306
PCT Pub. Date: Sep. 16, 2021

(65) Prior Publication Data
US 2024/0049139 A1    Feb. 8, 2024

(51) Int. Cl.
*H04W 52/02* (2009.01)
(52) U.S. Cl.
CPC .................. *H04W 52/0254* (2013.01)
(58) Field of Classification Search
CPC . H04W 52/02; H04W 52/0216; H04W 84/12; H04W 52/0229; H04W 84/18
USPC ........................................................ 370/311
See application file for complete search history.

(56) References Cited

U.S. PATENT DOCUMENTS

| | | | |
|---|---|---|---|
| 10,159,897 B2 * | 12/2018 | Penzias | G06F 3/03543 |
| 10,222,211 B2 * | 3/2019 | Chen | G01C 21/3635 |
| 11,927,448 B2 * | 3/2024 | Chidlovskii | G06N 3/02 |
| 2001/0020216 A1 * | 9/2001 | Lin | G01S 19/44 |
| | | | 701/472 |
| 2002/0127967 A1 * | 9/2002 | Najafi | H04W 52/0245 |
| | | | 455/67.11 |
| 2013/0085861 A1 | 4/2013 | Dunlap | |

(Continued)

FOREIGN PATENT DOCUMENTS

| | | | | |
|---|---|---|---|---|
| CN | 103376454 B | * | 12/2013 | ............. G01S 19/43 |
| EP | 1102398 A2 | | 5/2001 | |

(Continued)

OTHER PUBLICATIONS

Google Developers, "FusedLocationProviderApi", public interface FusedLocationProviderApi, Google APIs for Android, 2019, 1-17.

*Primary Examiner* — Peter G Solinsky
*Assistant Examiner* — Sanjay K Dewan
(74) *Attorney, Agent, or Firm* — Murphy, Bilak & Homiller, PLLC (57) ABSTRACT

A wireless communication device (100) and method therein for movement detection are disclosed. The wireless communication device comprises at least a modem (110) and an operating system (120). The wireless communication device (100) estimates by the modem (110) a relative movement of the wireless communication device. If the estimated relative movement is larger than a threshold, the modem (110) sends a movement notification to the operating system (120). The operating system (120) decides which action to be taken for the wireless communication device.

11 Claims, 3 Drawing Sheets

(56) References Cited

U.S. PATENT DOCUMENTS

| | | | |
|---|---|---|---|
| 2013/0314278 A1 | 11/2013 | Lim et al. | |
| 2013/0324196 A1* | 12/2013 | Wang | G06F 1/00 |
| | | | 455/574 |
| 2014/0075211 A1 | 3/2014 | Kumar et al. | |
| 2015/0208353 A1* | 7/2015 | Jung | H04W 52/0254 |
| | | | 455/574 |
| 2016/0337978 A1 | 11/2016 | Zappi et al. | |
| 2017/0280394 A1 | 9/2017 | Kim et al. | |
| 2018/0284815 A1* | 10/2018 | Cui | G05D 1/104 |
| 2019/0150094 A1* | 5/2019 | Liu | H04W 52/028 |
| | | | 370/311 |
| 2019/0319868 A1* | 10/2019 | Svennebring | H04W 24/08 |
| 2020/0293064 A1* | 9/2020 | Wu | G06N 3/045 |
| 2024/0034302 A1* | 2/2024 | Dallas | B60W 40/068 |
| 2024/0061128 A1* | 2/2024 | Rajgadiya | G01S 19/30 |
| 2024/0089736 A1* | 3/2024 | Monteuuis | H04W 12/122 |
| 2024/0192006 A1* | 6/2024 | Peng | G01S 19/50 |

FOREIGN PATENT DOCUMENTS

| | | | | |
|---|---|---|---|---|
| FI | 1 102 398 A2 * | 5/2001 | | H03H 17/02 |
| WO | WO 2006/137904 A2 * | 12/2006 | | G01S 5/14 |
| WO | WO 2017/156574 A1 * | 9/2017 | | G01S 5/00 |
| WO | WO 2020/109476 A1 * | 6/2020 | | G01C 21/16 |

* cited by examiner

METHODS FOR LOW ENERGY MOVEMENT DETECTION IN WIRELESS COMMUNICATION DEVICES

RELATED APPLICATIONS

This application is a U.S. National Phase of PCT/EP2020/056328 filed 10 Mar. 2020. The entire contents of the aforementioned application is incorporated herein by reference.

TECHNICAL FIELD

Embodiments herein relate to methods for movement detection in a wireless communication device. In particular, the embodiments relate to movement detection with lower power consumption.

BACKGROUND

The development of new generations of cellular systems simultaneously with upgrading existing generations allows for a wider range of radio access networks (RANs) and radio access technologies (RATs). Further, specifications for the Evolved Packet System (EPS), also called a Fourth Generation (4G) network, have been completed within the $3^{rd}$ Generation Partnership Project (3GPP) and this work continues in the coming 3GPP releases, for example to specify a Fifth Generation (5G) network. The introduction of 5G network or new radio (NR) provides the possibility for a new set of services or use cases for the network operators.

Smartphone operating systems (OS) offer a wide range of positioning methods. The different methods allow developers to tailor the positioning accuracy to fit their application use-case.

The trade-off between accuracy and power consumption as well as the more and more popular demand for accurate location has lead smartphone OS developers to pursue optimizations in this area.

Nowadays the smartphones' OS enables an array of sensors to aid in positioning service. Operating systems allow developers to set geo-fences for low accuracy location systems to in turn trigger high accuracy location actions.

With the advance of 5G and Internet of Things (IOT) the need to have location updates from non-smartphone devices with very low power consumption target is also evident.

Applications in need of accurate location updates on the device, even while sleeping or in low power mode, are today relying on information from lower power consumption add-on sensors like motion and accelerator sensors and/or a wakeup at regular intervals to trigger more detailed location systems.

This positioning information obtained by sensors is obviously not as reliable as with Global Navigation Satellite System (GNSS) systems. Hence a lot of effort is spent in trying to activate GNSS systems in an intelligent pattern. Wakeup at regular intervals and activating GNSS systems will cause high power consumption for the devices.

SUMMARY

It is therefore an object of embodiments herein to provide an improved method for movement detection in a wireless communication device.

According to an aspect of embodiments herein, the object is achieved by a method performed in a wireless communication device for movement detection. The wireless communication device comprises at least a modem and an operating system. The modem estimates a relative movement of the wireless communication device. If the estimated relative movement is larger than a threshold, the modem sends a movement notification to the operating system. The operating system then decides which action to be taken for the wireless communication device.

According to an aspect of embodiments herein, the object is achieved by a wireless communication device for movement detection. The wireless communication device comprises at least a modem and an operating system. The wireless communication device is configured to estimates by the modem a relative movement of the wireless communication device. If the estimated relative movement is larger than a threshold, the modem sends a movement notification to the operating system. The operating system then decides which action to be taken for the wireless communication device.

The embodiments herein provide a method for operating system (OS) wakeup based on modem movement detection. The solution provides a device with a possibility to wake up on movement for whatever reason e.g. even without a GNSS. The operating system can then decide what additional measure to take, e.g. to get a geo-pos fix to get more accurate positioning, depending on situation and system.

According to the embodiments herein, it is the modem that is responsible to wake up the OS on movement and trigger additional measures.

Consider now that the modem which is always included in low cost and low power consumption devices, such as IOT devices. The embodiments herein provide low cost IOT devices, for example a burglar alarm 5G device, to take action when moved. The gain may be in both that the device does not need to wake up at regular intervals to check if it has moved and it may also be the information of movement itself.

The embodiments herein also provide a possibility to only trigger extended fix when a device has moved and provide an improved geo-positioning without any significantly additional power consumption.

Therefore, the embodiments herein provide an improved method for movement detection in a wireless communication device.

BRIEF DESCRIPTION OF THE DRAWINGS

Examples of embodiments herein are described in more detail with reference to attached drawings in which.

DETAILED DESCRIPTION

Figure 1:
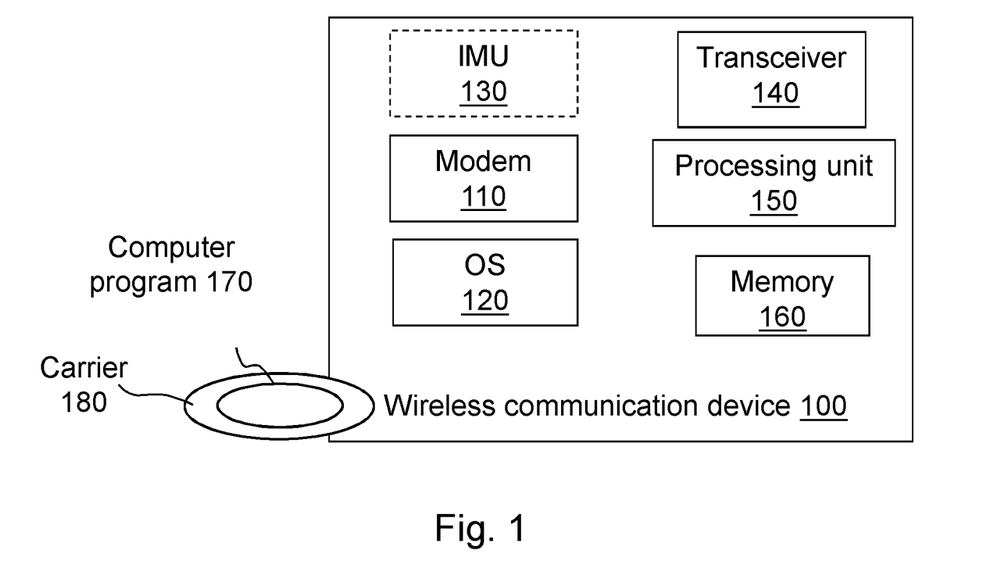
FIG. 1 is a block diagram illustrating function blocks for a wireless communication device.

FIG. 1 shows a block diagram of a wireless communication device 100 in which the method for movement detection according to embodiments herein may be implemented. The wireless communication device 100 comprises a modem 110, an operating system 120. The wireless communication device 100 may comprise one or more inertial measurement units IMU 130, such as accelerometer, gyroscope, proximity sensor etc. The wireless communication device 100 may comprise other units, where a transceiver 140, a processing unit 150 and a memory 160 are shown. The wireless communication device 100 may be a user equipment (UE) or a mobile device for a cellular communication system. It should be understood by the skilled in the art that "wireless communication device" is a non-limiting term which means any wireless communication terminal, user equipment, Machine Type Communication (MTC) device, IOT device, Device to Device (D2D) terminal, or any other network node e.g. smart phone, laptop, mobile phone, sensor, relay, mobile tablets or even a small base station communicating within a cell. The terms "user equipment", "UE" and "wireless communication device" may be used interchangeable herein.

According to embodiments herein, the wireless communication device 100 is configured to estimates by the modem 110 a relative movement of the wireless communication device. If the estimated relative movement is larger than a threshold, the modem 110 sends a movement notification to the operating system 120. The operating system then decides which action to be taken for the wireless communication device 100.

Several embodiments for handling of movement detection in multiple stages are described herein. In wireless communication devices, an IMU like an accelerometer and a gyroscope which consume less energy is always active. If a movement is detected by the IMU, the modem is triggered by the IMU to further calculate or perform a more precise movement detection. If the modem detects a movement, GNSS systems may be activated to make accurate positioning measurement. In other words, the positioning components, such as IMU, modem and GNSS are woken up in an order of energy consumption. The positioning is done hierarchically starting from a coarse movement detection by a low power positioning component to precise location measurement by a high power positioning component. The modem provides application-programming interface (API) towards OS to realize this method.

The solution is for the modem to offer an API for operating system (OS) wakeup based on modem movement detection.

The relative movement of a device may be estimated from an array of information available at the modem such as cell identity, Reference Signal Receive Power (RSRP), beam characteristics, timing advance and reference signals etc. For example, a movement detection function with relation to these parameters may be established to estimate or calculate a movement of the device. Especially in 5G and multi-antenna systems, the beamforming parameters will provide the UE with a new and improved way to detect movement. The beamforming parameters do not provide exact position unlike GNSS systems, but will provide information on how much it has relatively moved. This information may then be used by the operating system to offer applications a "wake on modem movement" subscription and in turn trigger a detailed GNSS geo-pos fix depending on situation and system. For example, many applications that run on a smartphone require positioning. The accuracy and periodicity of positioning depends on the service the application provides. Applications that provide tracking requires more accurate and frequent positioning fix whereas other applications require a coarse one-time positioning fix. The relative importance of each parameter in the movement detection function needs to be tuned and the problem then becomes suitable for machine learning type of solution but may also be handled with classic algorithmic solutions.

Figure 2:
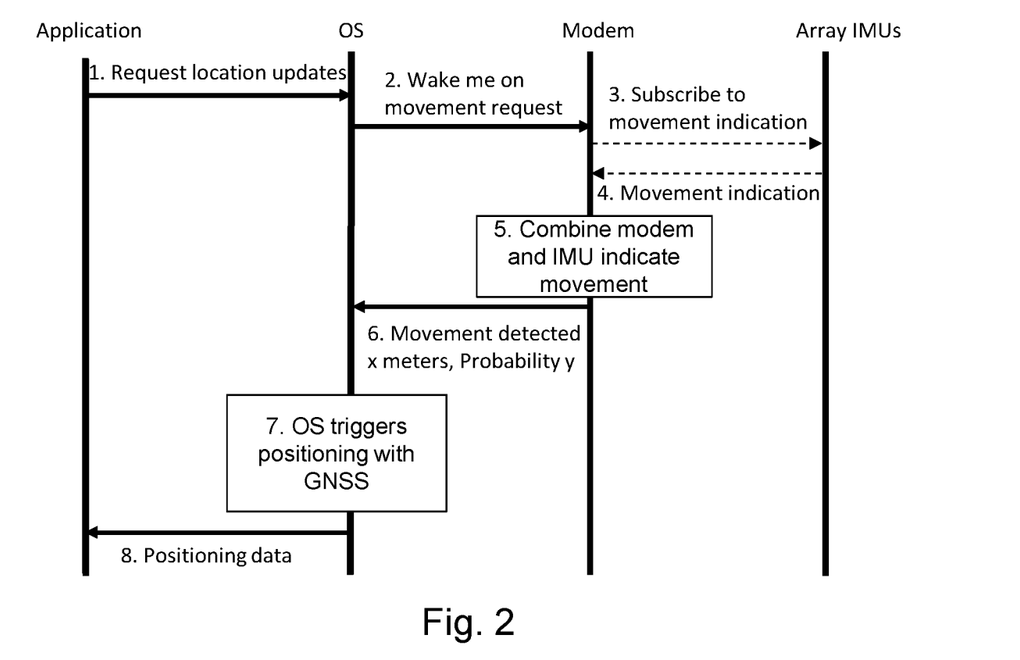
FIG. 2 is a signalling chart illustrating an example of a method for movement detection according to embodiments herein.

FIG. 2 shows a signaling chart for a method performed in a wireless communication device 100 for movement detection according to embodiments herein. The wireless communication device 100 comprises at least a modem and an operating system (OS). The wireless communication device 100 may comprise an array of IMUs.

As shown in FIG. 2, when an application requires positioning, the application sends a request to the operating system 120 in Step 1 indicated by an arrow line with "Request location updates". The operating system sends a request to the modem in Step 2 indicated by an arrow line with "Wake me on movement request". If the wireless communication device 100 comprises one or more IMUs, the modem may subscribe to movement detection data from IMUs in Step 3 indicated by an arrow line with "Subscribe to movement indication".

When a device moves or rotates, IMUs detect the movement and send an indication to the modem in Step 4 indicated by an arrow line with "Movement indication". Together with the modem's movement detection function like beam change, timing advance etc., the modem calculates an approximate distance X a device has moved, in Step 5 indicated by a block "Combine modem and IMU indicate movement". The movement detection may rely solely on the modem movement detection function and no combination with any IMU is necessary. If the distance X is above a threshold, the modem sends a movement notification to the operating system in Step 6 indicated by an arrow line with "Movement detected x meters, Probability y". A probability parameter y may be provided in the movement notification to indicate how sure the modem is about the movement. The OS may then trigger GNSS to make precise measurements of positioning of the wireless device in Step 7 indicated by block "OS triggers positioning with GNSS". The measurements are then reported to the application by sending the positioning data to the application in Step 8 indicated by an arrow line with "Positioning data".

Figure 3:
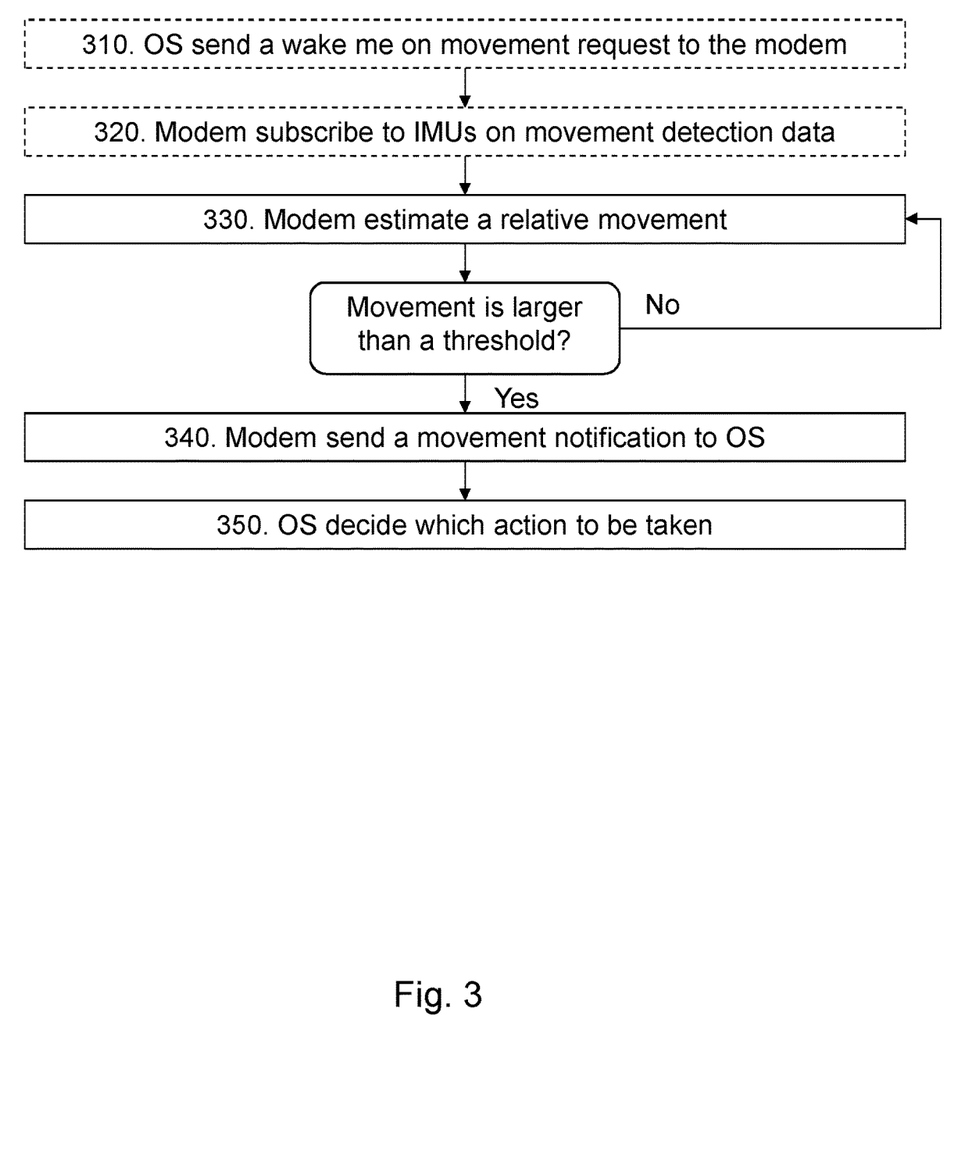
FIG. 3 is a flow chart illustrating an example of a method for movement detection according to embodiments herein.

According to the embodiments herein, a method performed in a wireless communication device 100 for movement detection will be described with reference to FIG. 3. The method comprises the following actions which may be performed in any suitable order and some actions are optional depending on different using scenarios and type of devices.

Action 310

The operating system 120 sends a wake me on movement request to the modem 110. The wake me on movement request may be sent upon receiving a positioning request from an application. When the application requires positioning, the application sends a request to the operating system 120.

The wake me on movement request may comprise one or more movement detection parameters such as a movement threshold, timers, filter coefficients etc.

This action is optional. The modem 110 may be configured to always report to the OS when it detects a movement.

The wake me on movement request may be disabled at boot. It may be set by an application or by the OS runtime.

Action 320

If the wireless communication device 100 comprises one or more IMUs 130, the modem 110 may subscribe to the one or more IMUs on movement detection data. When the one or more IMUs 130 detects that the wireless communication device 100 moves or rotates, the one or more IMUs 130 sends an indication to the modem 110.

Action 330

The modem 110 estimates a relative movement of the wireless communication device 100.

The modem 110 may estimate or detect a movement using an array of information available at the modem 110. For examples, cell identity, signal strength, beam characteristics, timing advance all give some information to indicate a movement.

Timing advance is the adjustment made to transmit time. It is based on the time a radio signal takes to reach the base station from the UE. Since radio waves travel at speed of light, the distance between base station and the UE can be calculated from the round trip delay. Typically, in Time division duplex systems, transmissions are adjusted by timing advance, so the traffic burst is received at the correct time. The changes in timing advance values are movement indications that the modem can use.

In multi-antenna systems with grid of beams (GOB) digital beamforming, a set of beams provide coverage to an entire cell. A beam typically covers a certain geographic area. The UE is connected to the base station on the strongest beam where the Signal to Noise ratio (SNR) is the highest. Base station switches the beams based on the channel estimates reported by the UE. A beam switch or change denotes the UE has moved.

Especially in 4G/5G systems, an example of beam characteristics may be beam space footprint. A beam space footprint can be defined by a set of strongest beams identified by beam indices and the power corresponding to the beams. The beam footprint maps to a geographical position and a change in beam space footprint is an indication that the device has moved.

The modem 110 may estimate or detect a movement by combining movement detection data from the one or more IMUs and information on cell identity, signal strength, beam characteristics, timing advance etc. The movement detection may rely solely on the modem movement detection function and no combination with any IMU is necessary.

Therefore, the estimation of a relative movement may be based on information of any one or a combination of movement detection data by one or more IMUs 130, cell identity, signal strength, beam characteristics, timing advance etc.

According to some embodiments herein, the estimation of a relative movement may be performed by looking up a table or pattern recognition. The table or pattern may be generated by machine learning the information on any one or a combination of movement detection data from one or more IMUs 130, cell identity, signal strength, beam characteristics, timing advance etc.

For example, considering the following input parameters:
Timing advance has changed 0.05 µs;
Power of beam2 has dropped by 5 dB;
Power of beam1 has increased 3 dB;
RSRP has changed 3 dB.

From these parameters, it is very hard to tell if the device has moved more than a threshold, such as 5 meters. But the problem as such is very suitable to machine learning (ML) systems where it simply feedback if this information was caused by a movement of 5 meters or more. This procedure may be iterated to produce a large table as shown in Table 1. This table may be fed into any standard machine learning system which in turn will learn what changes in modem parameters indicate a movement of the wireless communication device.

TABLE 1

| Movement >5 m | Timing Advance delta | Beamforming characteristics delta | RSRP delta | cellID | NR positioning |
|---|---|---|---|---|---|
| Yes | Some value | Some value | Some value | Some value | Some value |
| No | Some value | Some value | Some value | Some value | Some value |
| Yes | Some value | Some value | Some value | Some value | Some value |
| No | Some value | Some value | Some value | Some value | Some value |
| No | Some value | Some value | Some value | Some value | Some value |
| No | Some value | Some value | Some value | Some value | Some value |
| No | Some value | Some value | Some value | Some value | Some value |
| Yes | Some value | Some value | Some value | Some value | Some value |

Therefore machine learning and pattern recognition may be used to estimate a relative movement. A detection or estimation model may be built and trained using the data shown in Table 1. A movement detection function may be formulated and adapted to machine learning systems.

The detection or estimation model may be built and trained off-line, i.e. in a non-deployed scenario or in lab environment and deployed in the modem on-the-fly to decide if a movement has been occurred.

The data that is suitable to use for the modem to wake the OS may both be the modem internal parameters as well as including data from external sensors.

Figure 4:
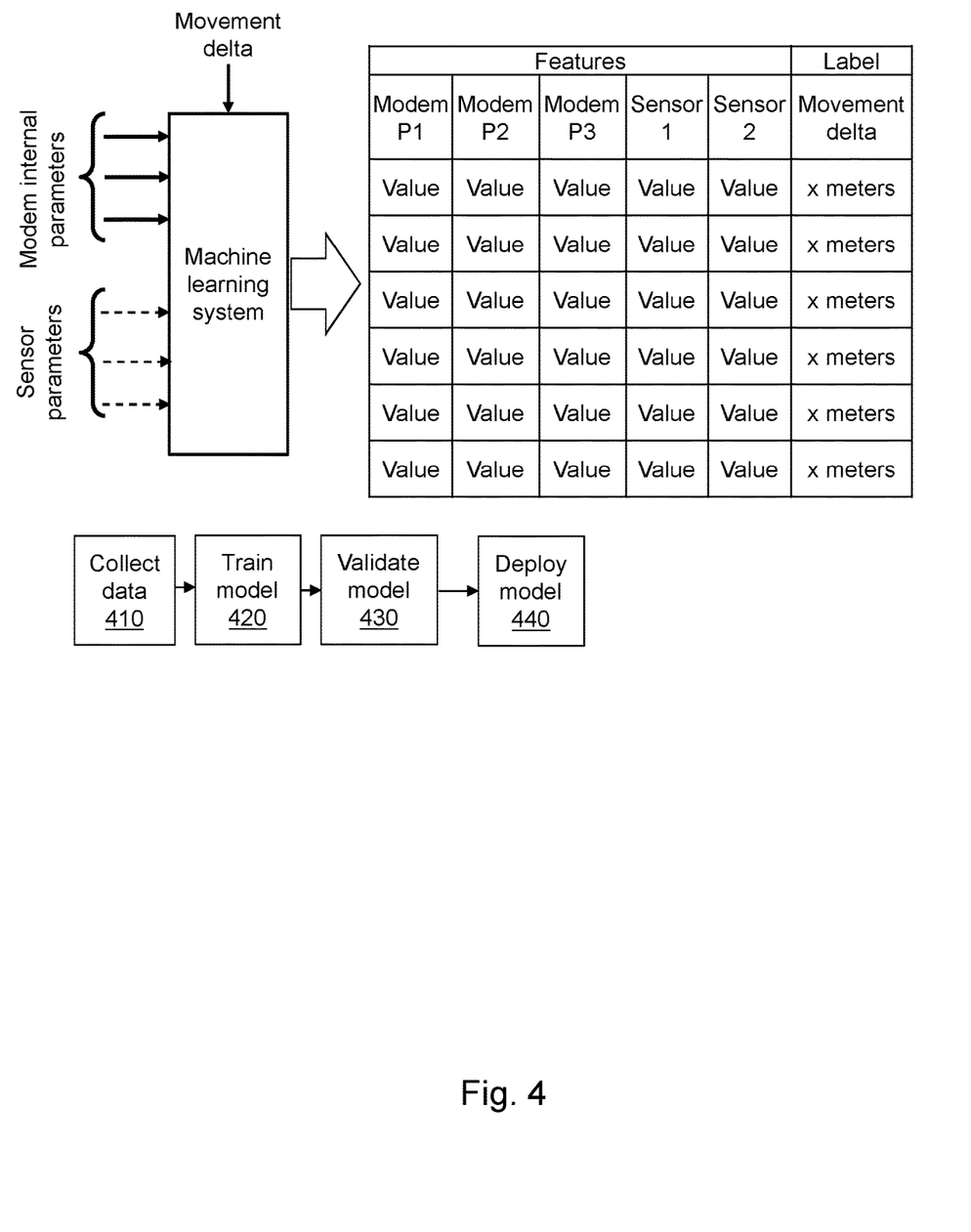
FIG. 4 is an example procedure illustrating machine learning according to the embodiments herein.

The data is aggregated in the modem. The machine learning model is typically trained and verified in a controlled environment. FIG. 4 shows an example procedure of machine learning.

The machine learning procedure will consist of data collection indicated by step 410 Collect data. In this procedure, the changes happening to input parameters when a UE moves is recorded. This procedure is to collect the data for training.

The collected data is pruned, and the training data is fed into a machine learning system, e.g. a neural network and run for a specific period. This procedure is indicated by step 420 Train model and is called model training period.

The trained model is then validated for a validation period in step 430 Validate model. It is an iterative process. The parameters are pruned and the model trained until it is validated satisfactorily. The trained model may be a table as shown in FIG. 4.

Then the trained model is deployed on a target device in step 440 Deploy model. At this stage, the model predicts a movement of a UE in a cell.

According to some embodiments, the estimation of a relative movement may be performed by filtering information on any one or a combination of movement detection data from one or more IMUs, cell identity, signal strength, beam characteristics, timing advance etc.

A UE in connected mode performs serving cell measurements and intra-frequency neighbor cell measurements on Discontinuous Reception (DRX) wakeup, e.g. every 1.28 Milliseconds. If Received Signal Strength Indicator (RSSI) or Reference Signal Receive Power (RSRP) or Reference Signal Receive Quality (RSRQ) of the serving cell changes above a predefined threshold, e.g. X dB, a movement detection may be sent from the modem 110.

In order to minimize false detection, the RSSI measurements may be filtered. Signal strength measurements are typically linearly averaged at Physical Layer (Layer1) and filtered according to the following equation at Radio Resource Control (RRC) Layer 3 (see TS 36.331):

$$F_n = (1-a) \cdot F_{n-1} + a \cdot M_n$$

Where, $M_n$ is the latest received measurement result from the physical layer;

$F_n$ is the updated filtered measurement result, that is used for evaluation of reporting criteria or for measurement reporting;

$F_{n-1}$ is the previous filtered measurement result, where $F_0$ is set to $M_1$ when the first measurement result from the physical layer is received; and $a=\frac{1}{2}(k/4)$, where k is the filter coefficient for the corresponding measurement quantity.

The filter coefficient decides how slow or fast the filtering shall be. The optimal filter coefficient may be obtained by simulations and experiments.

For the purpose of movement detection for wakeup OS, a similar filter like the RRC filter may be employed. The filter coefficient is chosen to avoid false detection.

In addition to signal strength measurements, signaling messages from the network node like RRC reconfiguration message may also be used to detect movement, for example:
Change of primary or secondary carrier in case of multi-connectivity and carrier aggregation;
Handover to another cell: Presence of "MobilityControlInfo" in Information Element (IE);
Change of beam index in case of millimeter wave beamforming.

Therefore according to some embodiments, the estimation of a relative movement may be performed based on signaling messages from a network node comprising any one of change of primary or secondary carrier in case of multi-connectivity and carrier aggregation, handover to another cell, change of beam index in case of millimeter wave beamforming etc.

According to some embodiments herein, the estimation of a relative movement of the wireless communication device may comprise applying a Kalman filter to the movement estimation by the modem and movement detection data from a sensor.

Accelerometers and modem when employed individually are subject to noise. In order to provide optimal movement detection, a combination of movement detection from the modem and these sensors may be used. That is multi-sensor fusion may be used to improve the movement detection. For this, a Kalman filter may be used. Kalman filtering, also known as linear quadratic estimation (LQE), is an algorithm that uses a series of measurements observed over time, containing statistical noise and other inaccuracies, and produces estimates of unknown variables that tend to be more accurate than those based on a single measurement alone, by estimating a joint probability distribution over the variables for each timeframe.

A popular application for the Kalman filter today is in GNSS. The GNSS measurements together with accelerometer are used to determine position of a mobile device.

For low cost narrow band NB-IOT devices that do not have a GNSS receiver, sensor fusion involving modem and accelerometer is proposed according to embodiments herein.

The inputs to Kalman filter:
Movement detection indication from the modem every DRX cycle.
Movement detection from the IMUs, e.g. accelerometer, gyroscope, proximity sensor.

According to some embodiments, the estimation of a relative movement of the wireless communication device may be performed based on an algebraic solution. For example, an algorithm may be implemented and tuned:
If beam change>X and RSRP change>Y then movement greater than 5 meters is likely, then wake OS.

Action 340

If the estimated relative movement is larger than a threshold, the modem 110 sends a movement notification to the operating system 120. The movement notification sent by the modem 110 may comprise a probability of the estimated relative movement to indicate how sure the modem 110 is about the estimated movement.

The threshold to wake up OS may be set in a subscription. There may be for examples:
Wake me if movement>10 meters
Wake me if movement>50 meters
Wake me if movement>100 meters with probability 0.89.

Action 350

The operating system 120 decides which action to be taken for the wireless communication device 100.

If the wireless communication device 100 comprises a GNSS, then the operating system 120 may activate the GNSS to make a positioning measurement for the wireless communication device 100.

The operating system 120 may send an alarm to a user of the wireless communication device 100.

To summarize, the method for movement detection according to embodiments herein may be employed by different types of wireless communication devices for different applications.

For IOT devices, stationary IOT devices are typically shipped without any positioning system, e.g. GNSS. The reason for this is mainly that the device is not intended to be moved, such as a surveillance camera or a fire-alarm, a burglar alarm etc. The other reason is of course to keep cost and power consumption low by avoiding adding features that are rarely needed.

There might however still be a need to know if the device has moved and for example trigger a user alert or some internal function. Burglar alarms should alert user if moved.

The movement indication may be obtained by sensors like accelerometer, but all sensors have a cost and some types of devices, e.g. IOT devices, don't have positioning sensors. However, a modem is always included in an IOT device. According to embodiments here in, the modem may offer the functionality to wake the OS. The gain of using the modem may be in both that the IOT device does not need to wake up at regular intervals to check if it has moved, or it may also be the information of movement itself.

For smartphones, the operating system is today providing a wide array of positioning schemes and systems. The main concept today is for the OS to control an array of sensors including Assisted-GNSS (AGNSS) information from the modem to allow application developers to have different power and accuracy levels for their application. For example, the fused location provider is a location API in Google Play services that intelligently combines different signals to provide the location information that an application needs.

According to embodiments here in, the modem offers an API same as for the IOT device to wake the OS on a movement above a threshold.

The operating system can then decide what additional measure to take to get a geo-pos fix, using any one of or a combination of WLAN, GNSS or AGNSS depending on situation and system.

The key concept of the embodiments herein is that it is the modem that is responsible to wake OS on movement and trigger additional measures. While current behavior is for the modem to report in status and then let OS tell the application to wake up. Hierarchical movement detection using different movement detection units, e.g. firstly IMU if present in a device, secondly modem and then GNSS, is based on the amount of power consumption of each movement detection unit. Using the modem to control the movement detection can save power since it is always on anyway in a device and free of extra battery consumption like other IMU sensors.

Those skilled in the art will appreciate that the modem 110 and the transceiver 140 described above may be referred to one unit, a combination of analog and digital circuits with one or more processors configured with software and/or firmware and/or any other digital hardware performing the function of each unit. Further the OS 120 and the processing unit 150 may also be referred to one unit, a combination of analog and digital circuits with one or more processors configured with software and/or firmware and/or any other digital hardware performing the function of each unit.

The embodiments herein may be implemented through one or more processors with computer program code 170 for performing the functions and actions of the embodiments herein. The program code 170 mentioned above may also be provided as a computer program product, for instance in the form of a data carrier 180 carrying computer program code for performing the embodiments herein when being loaded into the wireless communication device 100. The computer program code 180 may furthermore be provided as pure program code on a server or cloud and downloaded to the wireless communication device 100.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appended claims.

The invention claimed is:

1. A method performed in a wireless communication device, the method comprising:

estimating by a modem of the wireless communication device, a relative movement of the wireless communication device, wherein the modem is configured for radio signal communications with a wireless communication system and is further configured to estimate the relative movement from changes in one or more radio signal parameters of the modem;

sending by the modem a movement notification to an operating system implemented by processing circuitry of the wireless communication device, the movement notification sent in response to the estimated relative movement being larger than a threshold; and deciding by the operating system an action to be taken for the wireless communication device in response to the movement notification, the action being activation of a global navigation satellite system (GNSS) receiver of the wireless communication device, to make a positioning measurement for the wireless communication device.

2. The method according to claim 1, further comprising receiving an indication of the threshold from the operating system.

3. The method according to claim 1, wherein the wireless communication device further comprises one or more inertial measurement units (IMUs), and the method further comprises:

subscribing by the modem to the one or more IMUs, for movement detection data;

sending by the one or more IMUs an indication to the modem, responsive to the one or more IMUs detecting that the wireless communication device moves or rotates.

4. The method according to claim 1, wherein the changes in the one or more radio signal parameters of the modem comprise one or more of: a detected change in cell identity with respect to the cellular communication system, a detected change in signal strength with respect to the cellular communication system, a detected change in beam characteristics with respect to the cellular communication system, or a change in a timing advance value received from the cellular communication system.

5. The method according to claim 1, wherein the method further includes the operating system outputting an alarm for a user of the wireless communication device, in response to the movement notification.

6. The method according to claim 1, wherein the method includes the modem deciding whether the relative movement of the wireless communication device exceeds the threshold based on using the changes in the one or more radio signal parameters of the modem to index into a look-up table that associates radio signal parameter changes to movement amounts, or by inputting the changes in the one or more radio signal parameters of the modem to a machine learning algorithm trained to learn the association between radio signal parameter changes and corresponding movement amounts of the wireless communication device.

7. The method according to claim 1, wherein the threshold indicates a threshold distance of movement and wherein the modem estimates a distance by which the wireless communication device has moved based on a change in one or more of a radio signal strength, a change in timing advance, or a change in detected beam characteristics, all with respect to a wireless communication system with which the modem communicates via radio signals.

8. A wireless communication device configured for movement detection, the wireless communication device comprising:

a modem configured for radio signal communications with a wireless communication system; and processing circuitry that implements an operating system;

wherein the modem is configured to estimate a relative movement of the wireless communication device from changes in one or more radio signal parameters of the modem and send a movement notification to the operating system in response to the estimated relative movement being larger than a threshold; and wherein the operating system is configured to decide an action to be taken for the wireless communication device in response to the movement notification, the action being activation of a global navigation satellite system (GNSS) receiver of the wireless communication device, to make a positioning measurement for the wireless communication device.

9. The wireless communication device according to claim 8, wherein the modem is configured to receive an indication of the threshold from the operating system.

10. The wireless communication device according to claim 8, wherein the wireless communication device comprises one or more inertial measurement units (IMUs), wherein the modem is configured to subscribe to the one or more IMUs for movement detection data, and wherein the one or more IMUs are configured to send an indication to the modem, responsive to the one or more IMUs detecting that the wireless communication device moves or rotates.

11. The wireless communication device according to claim 8, wherein the changes in the one or more radio signal parameters of the modem comprise one or more of: a detected change in cell identity with respect to the cellular communication system, a detected change signal strength with respect to the cellular communication system, a detected change in beam characteristics with respect to the cellular communication system, or a change in timing advance value received from the cellular communication system.

* * * * *